United States Patent
Brun

(10) Patent No.: US 8,292,375 B2
(45) Date of Patent: Oct. 23, 2012

(54) LINKING PIN FOR THE CHAIN LINKS OF VEHICLE TRACKS

(75) Inventor: Michel Brun, Maintenon (FR)

(73) Assignee: Nexter Systems, Roanne (FR)

( * ) Notice: Subject to any disclaimer, the term of this patent is extended or adjusted under 35 U.S.C. 154(b) by 262 days.

(21) Appl. No.: 12/654,250

(22) Filed: Dec. 15, 2009

(65) Prior Publication Data
US 2010/0148576 A1 Jun. 17, 2010

(30) Foreign Application Priority Data
Dec. 16, 2008 (FR) .................. 08 07143

(51) Int. Cl.
*B62D 55/092* (2006.01)

(52) U.S. Cl. ...................... 305/203; 305/59

(58) Field of Classification Search .......... 305/103, 305/104, 202, 203, 204, 59, 50
See application file for complete search history.

(56) References Cited

U.S. PATENT DOCUMENTS

| | | | |
|---|---|---|---|
| 2,391,907 A | 1/1946 | Knox | |
| 4,139,241 A | 2/1979 | Huhne et al. | |
| 4,438,981 A * | 3/1984 | Harms | 305/118 |
| 4,840,438 A * | 6/1989 | Cory | 305/160 |
| 4,892,365 A * | 1/1990 | Szakacs | 305/59 |
| 6,450,594 B1 * | 9/2002 | Ketting et al. | 305/203 |
| 7,850,256 B2 * | 12/2010 | Mulligan | 305/104 |

FOREIGN PATENT DOCUMENTS

FR 2 537 939 6/1984

OTHER PUBLICATIONS

French Search Report issued in Application No. 08.07143; mailed on Jul. 7, 2009 (with English translation).

* cited by examiner

*Primary Examiner* — Kip T Kotter
(74) *Attorney, Agent, or Firm* — Oliff & Berridge, PLC

(57) ABSTRACT

The invention relates to a linking pin between the chain links of a vehicle track and the connectors of these links, such pin incorporating at least one ring of a synthetic material coating, positioned between the pin and at least one link, the pin incorporating at least two supports on either side of the ring, characterized in that it comprises at least one axial bore enclosing a material incorporating a liquid phase and enabling the calories that may build up in the ring to be evacuated towards the connectors.

11 Claims, 3 Drawing Sheets

LINKING PIN FOR THE CHAIN LINKS OF VEHICLE TRACKS

BACKGROUND OF THE INVENTION

1. Field of Invention

The technical scope of the invention is that of vehicle tracks and more particularly that of endless tracks and the linking means between the chain links of an endless track. It is known to produce vehicle tracks by assembling different links using pins and connectors.

2. Description of the Related Art

Reference may be made, for example, to patents U.S. Pat. No. 4,700,992 and U.S. Pat. No. 4,139,241 that describe such tracks.

By way of example, FIGS. 1a and 1b show such a type of known linking means. FIG. 1a shows four links 1 (1a, 1b) assembled together and FIG. 1b shows an exploded view of different components of this assembly. The parts shown in black in the Figures are made of rubber.

We can see in these Figures that the links 1 are not directly linked to one another. They are made integral by means of pins 2 and connectors 3.

Thus, each link 1 incorporates two parallel drill holes 4 that each receives a pin 2 (only one pin is shown in FIG. 1b).

We can see in FIG. 1b that each pin 2 thus carries two links 1a, 1b that are symmetrical to one another. Each pair of links 1 is then fixed to another similar pair by means of connectors 3 that are attached to the pin 2. FIG. 1a shows such an assembly.

We note in FIG. 1a that, after the chain links 1 have been assembled with the pins 2, the ends 2a of the pins 2 protrude from the external edges of the chain links 1 thereby enabling the connectors 3 to be fixed. Each pair of links 1a, 1b is thus fixed to a neighboring pair by two end connectors 3.

We further note that each pair of chain links 1a, 1b is also fixed to the next pair by a central connector 5 (also visible in FIG. 1b). This central connector incorporates two flanges fixed by screws and carries an extension 5a that acts as a guiding tooth for the track.

Classically, the end connectors 3 comprise two cylindrical holes 3a, 3b intended to cap the pins 2, and linked by tongues 6a, 6b. A screw 7 passes through the tongues 6a, 6b cooperating with a female thread arranged in one of the tongues. Tightening this screw allows the tongues 6a, 6b to be elastically brought together thereby causing the connector 3 to tighten on the pins 2.

The connector 3 and the ends of the pin may be provided with one of several flat areas (not shown). Such an arrangement will ensure the relative positioning of the links giving a prior bending between successive links. The winding of the tracks on the sprocket wheel, the idler and the end rollers of the running gear.

As may be seen more particularly in FIG. 1b, each pin 2 incorporates two rings 8 of a coating of synthetic material. The pin thus incorporates three supports 9a, 9b and 9c (that may be cylindrical or prismatic), such supports delimiting the two rings 8. The connectors 3 and 5 are fixed to these supports.

More often than not the rings 8 are made of rubber, either in a single block by duplicate molding or by threading different concentric rings bonded to one another (rings called "adherites").

These rings 8 are positioned between the pin 2 and the link 1. They enable part of the mechanical stresses received by the links to be absorbed. They also enable a metal on metal friction to be avoided between the pin 2 and the link when the track is in operation. In fact, such friction would lead to the premature wear of the pins thereby causing failures.

Furthermore, the rubber of which the rings 8 are made allows different deformations for the pins 2 from one link to another during the operation of the track. The rings 8 must not slip during operation and through their deformation they withstand the relative torsions of the pins 2 with respect to the links 1.

Such a classical assembly, however, suffers from drawbacks.

Indeed, the deformations to which they are subjected cause substantial heating of the rings 8. These are further heated by the links 1 themselves which, when traveling, are stressed by being crushed between the ground and the vehicle's rollers. The rings 8, overheated, have difficulty cooling down, since rubber-type materials do not conduct heat well.

This results in a deterioration of the rings, which end up by no longer separating the pins 2 from the links 1. This leads, in the more or less long term, to a metal on metal contact of the pin 2 with the links 1 (1a, 1b). This contact increases the overheating thereby destroying the adherite rings as well as other rubber parts in the link. Resistance to the forward motion of the vehicle is thus increased and can lead to the failure of the tracks.

SUMMARY OF THE INVENTION

The invention aims to propose a linking pin that limits the overheating of the synthetic rings thereby improving the service life of the tracks.

Thus, the invention relates to a linking pin between the links of a vehicle track and the connectors of these links, such pin incorporating at least one ring of a synthetic material coating, such ring positioned between the pin and at least one link and enabling part of the mechanical stresses to which the links are exposed to be absorbed, the pin incorporating at least two supports on either side of the ring, supports onto which the connectors are fixed, the pin comprising at least one axial bore extending longitudinally from one support to the other, the bore being blocked on one side and on the other by closing means and enclosing a material incorporating a liquid phase and enabling the calories that may build up in the ring to be evacuated towards the connectors, the volume of this material in the liquid state being below the total volume of the bore so as to enable the material to circulate.

Preferably, the volume of the material in the liquid state will take up less than half the total volume of the bore.

The inner surface of the bore may advantageously incorporate longitudinal grooves.

At least one closing means for the bore will be removable.

The bore enclosing the material may be in a partial vacuum.

According to a first embodiment, the material will be selected such that it vaporizes at a temperature of at least 20° C. below a critical temperature Tc, defined as the temperature at which the ring is likely to deteriorate, the vaporization of the material occurring in the hottest parts of the pin, and the material condensing near to the connectors, a convection motion appearing inside the pin ensuring its cooling in the vicinity of the ring.

The vaporizable material may be selected from among the following materials: water, alcohols, trichloroethylene, trichloroethane, tetrahydrofuran, thiols.

According to another embodiment, the material will be a metal or metallic alloy that is liquid at one temperature of at least 20° C. below a critical temperature Tc, that is to say a temperature at which the ring is likely to deteriorate.

For a critical temperature of around 120° C., the metal or metallic alloy may be selected from the following list: sodium, potassium, rubidium, gallium, cesium, mercury, sodium/potassium alloy.

BRIEF DESCRIPTION OF THE DRAWINGS

The invention will become more apparent from the following description, such description made with reference to the appended drawings, in which.

DETAILED DESCRIPTION OF PREFERRED EMBODIMENTS

Figure 2:
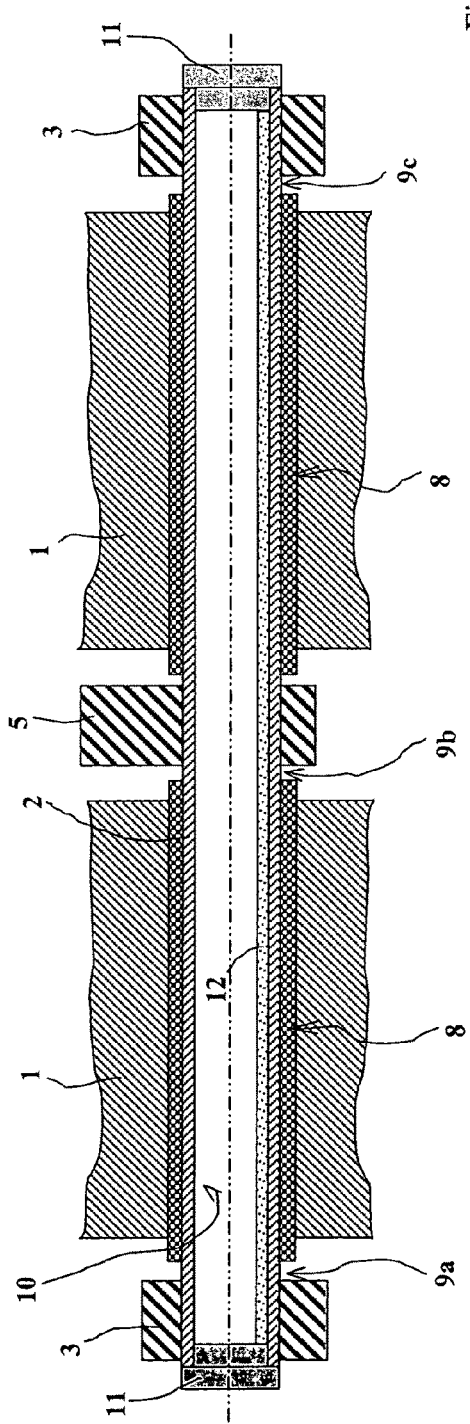
FIG. 2 is a partial longitudinal section view of a pin in accordance with the invention installed on a pair of chain links.
Figure 3:
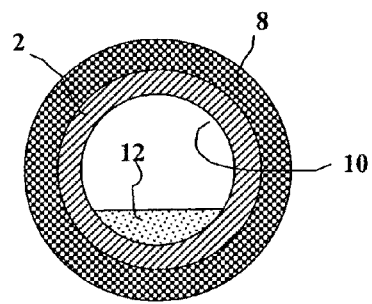
FIG. 3 is a view of this same pin, along and in cross section, FIG. 4 schematizes the operation of the pin according to the invention.

With reference to FIGS. 2 and 3, a linking pin 2 according to a first embodiment of the invention incorporates, as per prior art, two rings 8 of a synthetic material coating (for example, rubber). These rings 8 are positioned between the pin 2 and the chain links 1.

Figures 1A, 1B:
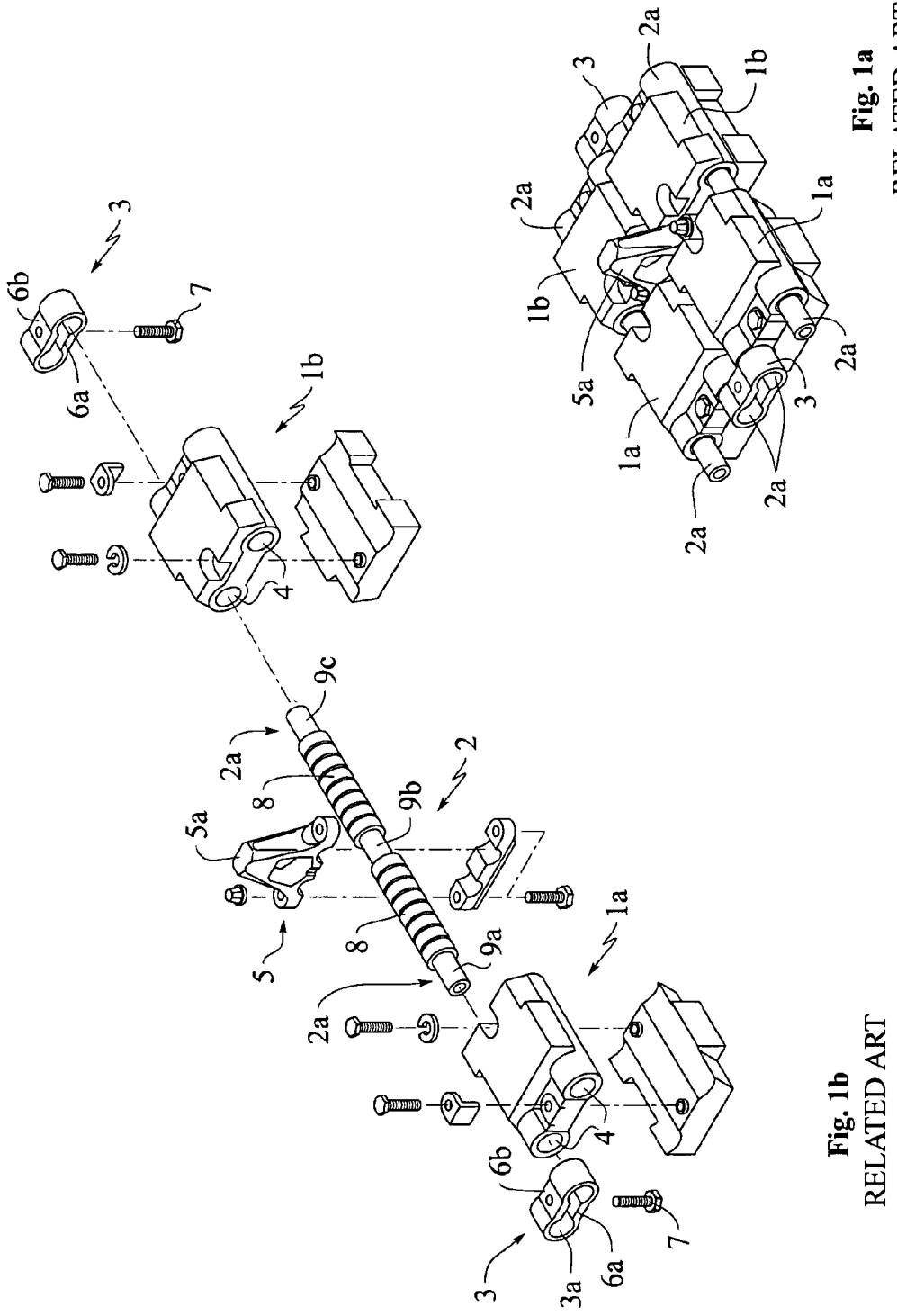
FIGS. 1a and 1b show linking means for the chain links of a track using pins and connectors according to prior art, FIG. 1a being an assembled view and FIG. 1b a partially exploded view.

As previously described with reference to FIGS. 1a and 1b, the rings 8 delimit supports 9a, 9b and 9c on the pin 2. The median support 9b receives a central connector 5 and the lateral supports 9a and 9c each receive an end connector 3.

According to one characteristic of the invention, the pin 2 is tubular and thus comprises an axial bore 10 that extends longitudinally from support 9a to support 9c.

This bore 10 is blocked at both ends by closing means 11 that are constituted here by threaded plugs, each cooperating with a female thread in the bore 10.

It would naturally be possible for other closing means to be implemented (a welded plug, for example).

According to another characteristic of the invention, the bore 10 encloses a material 12 that incorporates a liquid phase.

The material 12 does not, in the liquid state, fully fill the total volume of the bore. In fact, it is necessary for the material 12 to be able to circulate in this bore 10.

At room temperature, the volume occupied by the material will preferably take up less than half of the total volume of the bore. At least one of the plugs 11 will be removable (for part of the service life of the equipment) thereby enabling the material 12 to be introduced or replenished.

According to a first embodiment of the invention, the material 12 is selected such that it vaporizes at a temperature of at least 20° C. below a critical temperature Tc, defined as that at which the ring 8 is likely to deteriorate.

In practical terms, if the critical temperature is of around 120° C., a fluid will be chosen that vaporizes at a temperature of below or equal to Tc-120° C., in other words around 100° C.; for example, water, methanol, ethanol, other alcohols of higher molecular weight (such as isopropanol), trichloroethylene or trichloroethane, tetrahydrofuran, thiols.

Thiols are chemical substances that are the counterparts of alcohols, in which a —SH ending (sulfhydrile) replaces the —OH ending of alcohols.

Figure 4:
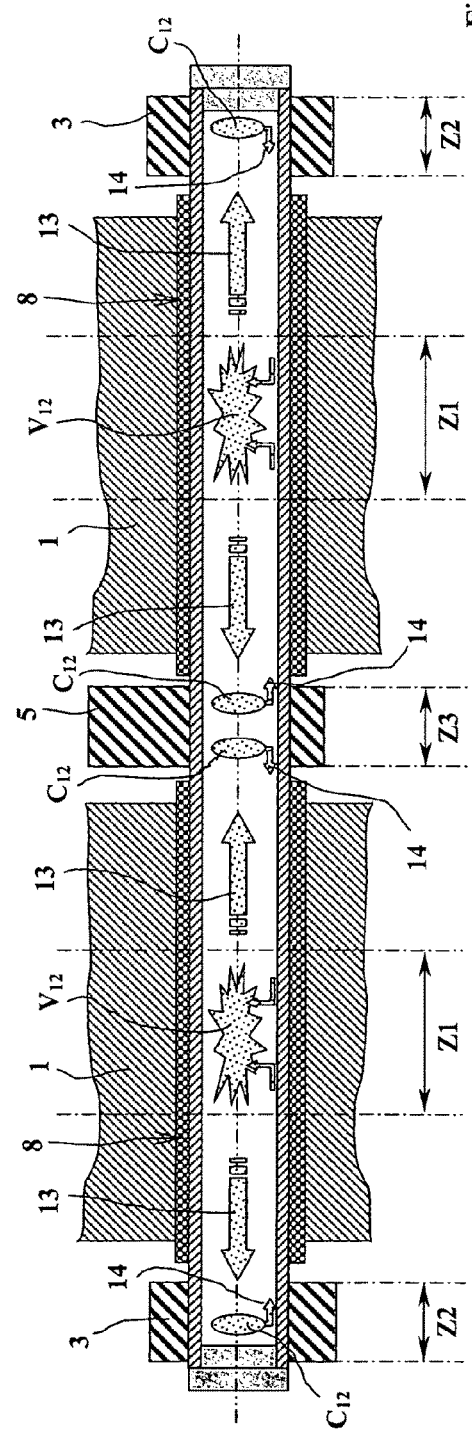

FIG. 4 schematizes the mode of operation of the pin according to the invention.

During the operation of the track, the temperature of the chain link 1 rises considerably. This results in the appearance of median zones Z1 at which the temperature is maximal (around Tc=120° C. in our hypothesis, without the invention being implemented), whereas the peripheral zones Z2 and Z3 have a lower temperature, firstly because of their contact with the ambient air (for end zones Z2) and the presence of metallic masses in direct contact with the pin 2 and enabling the evacuation of the calories (connectors of different types, median 5 and end 3, portions of chain links that are not coated with rubber, both for zones Z2 and Z3).

During the implementation of the invention, the temperature of peripheral zones Z2 and Z3 will increase. In parallel, the temperature of the median zones Z1 will drop. All the temperatures will tend towards the vaporization temperature of the liquid (close to 20° C. under the critical temperature Tc).

In the Figures, the zones are located purely by way of illustration. The temperature is naturally not the same over the full length of each zone, or between the different zones. The thermal differences will remain moderate, however. The hottest part of zone Z1 is located substantially mid-way between connectors 3 and 5. The temperature decreases gradually between this median part and the ends of the pin 2.

The material 12 will vaporize (appearance of a vapor phase $V_{12}$) in zones Z1 of the tube 2. This change of state leads to the absorption of calories supplied by the tube, and thus to the cooling of zone Z1.

The vapor generated, which occupies a greater volume than the liquid from which it originated, spreads to either side of zone Z1 (arrows 13) in the direction of the coldest parts of the tube 2, thus towards zones Z2 and Z3.

In these later zones Z2 and Z3 the material will condense ($C_{12}$). This return into the liquid state transfers calories to connectors 3, 5 that were picked up in the hot zones Z1. This liquid will then run along the walls of the tube 2 (arrows 14). This return is facilitated by the vigorous shaking of the pin 2 consequent to the normal functioning of the tracks.

The liquid material 12 thus returns into the central zones Z1 where it will vaporize once again. Thus, in the steady state a convection movement appears inside the pin that ensures its cooling in the vicinity of the crown 8.

The pin 2 according to the invention thus constitutes a heat engine (heat pipe) that ensures the cooling of the insulating rings 8 thereby enabling them to be kept at a reasonable temperature and increasing their service life.

The difference in temperature between zones Z1 and Z2/Z3 along the pin according to prior art (thus not incorporating the invention) may reach 40° C. Implementing the invention, enables the temperature of the pin to be limited to the change of state temperature (that is, at least 20° C. below the critical temperature Tc).

This difference of at least 20° C. has been selected to ensure in all cases an operating temperature in the steady state that is considerably below the critical temperature Tc.

The pin 2 proposed by the invention thereby constituted a heat pipe in which a fluid spontaneously circulates between its liquid and vapor phases. The "heat engine" of this heat pipe is constituted by the changes of phase and the absorption-release of the associated latent heat.

The principal heat exchanges occur at the end of the line, that is, on the walls of zones Z1 and Z2/Z3.

The incoming thermal flux (Z1 side) and the outgoing thermal flux (Z2-Z3 side) will balance out by the increase in internal pressure and the temperature (until this reaches the temperature at which the liquid changes state), until flux equality is achieved.

The material 12 will be selected according to the critical temperature Tc of the ring 8. Advantageously, the material 12 will be put into place in the bore 10 under a partial vacuum. Such an arrangement facilitates the convection motion, the gaseous phase is thus unhindered by an additional mass of air.

The partial vacuum also enables the vaporization-condensation phenomenon to be rapidly engaged since, at low pressure, boiling temperatures are considerably lowered.

This initial vacuum will be chosen to be enough to guarantee acceptable heat levels in the "internal pressure-state change temperature" couple that will appear (the vaporization, in fact, inevitably raises the internal pressure in the bore).

Someone skilled in the art will be able to perform numerical simulations of the thermal flux to determine the value required for the vacuum as well as the associated vaporization temperature, thereby also enabling the most suitable material 12 to be selected.

It is not a problem to use a material likely to freeze. Indeed, when the pin is in operation, liquefaction will occur automatically with the heating of the pin (naturally this change of state is reversible for the material in question) and the subsequent vaporization/condensation cycle will continue normally. If there is an increase in the volume of the material linked to its freezing, this will be able to occur without any damage because the bore is only partially filled (below half of the volume in the liquid state).

So as to favor the adherence of the liquid phase to the walls of the pin 2 as well as its return movement by capillarity, longitudinal grooves will advantageously be provided on the inner surface of the bore 10.

Figure 5:
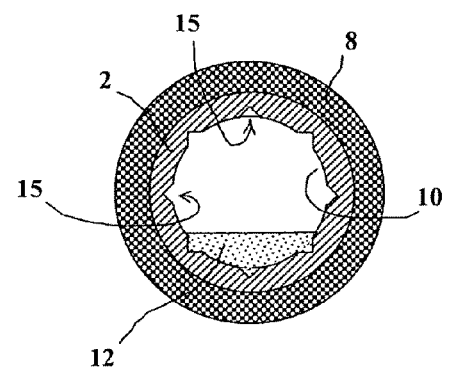
FIG. 5 is a cross-section view of a pin according to another embodiment of the invention.

FIG. 5 shows a section view of a pin 2 thus incorporating V-shaped grooves 15, such grooves being evenly spaced angularly around the axis of the bore 10 (here there are eight grooves). It is naturally possible for grooves to be made that have another shape (U-shaped, for example). The grooves 15 furthermore enable the heat exchange surface to be increased between the liquid 12 and the pin 2. The U-shaped groove, in fact, is the shape that provides the largest exchange surface.

Figure 6:
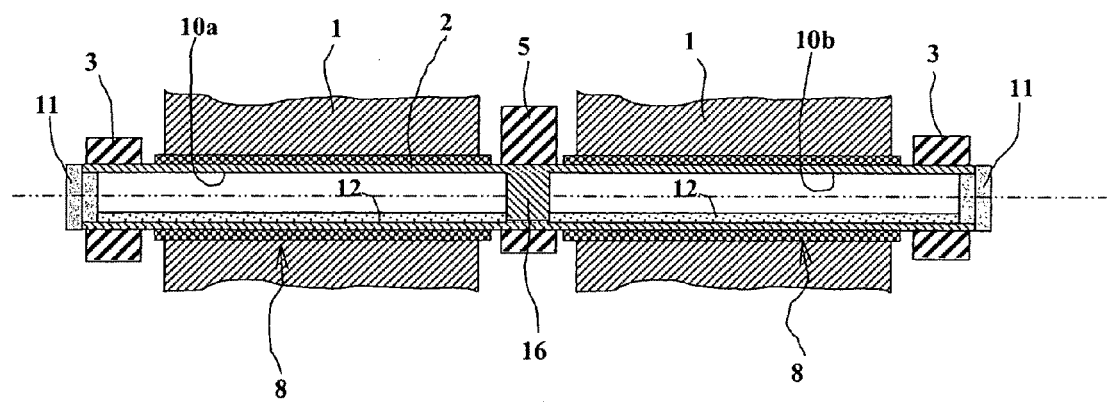
FIG. 6 is a longitudinal section view of a pin according to another embodiment of the invention.

FIG. 6 shows another embodiment of the invention that differs from the previous one in that the pin 2 incorporates two bores 10a and 10b separated by a dividing wall 16 made of a heat conducting material. The dividing wall 16 is positioned on a median connector 5. Each bore 10a, 10b is blocked by a specific plug 11 and encloses a material 12.

This embodiment enables the heat transfer to be improved with respect to the median connector 5. This dividing wall 16, as well as the plugs 11, may be provided with barbs or other asperities increasing its heat exchange surface.

The dividing wall 16 in fact constitutes a cold zone in good thermal contact with the connector 5. The pin 2 in this case incorporates two separate heat engines, one for each chain link 1 integral with the same pin 2. The convection movements directed towards the median connector 5 are stopped by a cold dividing wall 16 on which the condensation is more easily made.

According to a second embodiment of the invention, by way of a material 12 a metal (or metal alloy) that is liquid at a temperature of at least 20° C. below the critical temperature Tc (temperature at which the ring is likely to deteriorate) can be used instead of a vaporizable material.

In this case, the physical phenomenon implemented for cooling is no longer the change of state of a material but simple heat conduction, activated by the forward motion of the vehicle.

Liquid metals have high thermal conductivity and the shaking to which they are subjected during the forward motion of the track facilitates the evacuation of calories between the hot zone Z1 and the cold zones Z2 and Z3.

With a critical temperature of around 120° C. (for example), the metal (or metal alloy) may be selected from among the following: sodium (melting point 95° C.), potassium (melting point 63° C.), rubidium (melting point 39° C.), gallium (melting point 30° C.), cesium (melting point 29° C.), NaK=sodium-potassium alloy (melting point=−12° C.), mercury (melting point −39° C.)

The toxicity and strong reactivity of a good number of these materials with respect to oxygen, humidity and various other elements will require specific precautions to be taken during its insertion into the bore 10 in the pin 2.

The bore 10 must be fully and permanently hermetic with its end plugs in place (welded). The chemical compatibility of the metal or alloy inserted with the constituent material of the pin 2 and plugs 11 must be verified.

Once again, a vacuum may be made in the bore 10 thereby avoiding any problems of oxidation of the metals in question. A partial vacuum may, in fact, be made in the bore implementing a gas that is inert with respect to the metals or alloys.

What is claimed is:

1. An assembly comprising:
 a plurality of track chain links;
 a plurality of connectors that connect the plurality of track chain links;
 a linking pin that axially extends through the plurality of track chain links and the plurality of connectors;
 a ring of a synthetic material that coats the linking pin, the ring being positioned between the linking pin and a track chain link of the plurality of track chain links, wherein:
  the linking pin includes a first support on a first side of the ring onto which a first connector of the plurality of connectors is fixed and a second support on a second side of the ring onto which a second connector of the plurality of connectors is fixed,
  the linking pin includes an axial bore extending longitudinally from the first support to the second support,
  the bore is blocked on the first side and on the second side by closing means, and
  the bore is fully and completely hermetic; and
 a material located in the bore, the material incorporating a liquid phase and enabling calories that may build up in the ring to be evacuated towards the plurality of connectors, a volume of the material in the liquid phase being below a total volume of the bore so as to enable the material to circulate.

2. The assembly according to claim 1, wherein the volume of said material in the liquid phase takes up less than half the total volume of said bore.

3. The assembly according to claim 2, wherein an inner surface of said bore incorporates longitudinal grooves.

4. The assembly according to claim 2, wherein said material vaporizes at a temperature of at least 20° C. below a critical temperature Tc, defined as a temperature at which said ring is likely to deteriorate, the vaporization of said material occurring in the hottest parts of said pin, and said material condensing near to said connectors, a convection motion appearing inside said pin ensuring its cooling in the vicinity of said ring.

5. The assembly according to claim 1, wherein at least one closing means for said bore is removable.

6. The assembly according to claim 1, wherein said bore enclosing said material is in a partial vacuum.

7. The assembly according to claim 6, wherein said material is a metal or metallic alloy that is liquid at one temperature of at least 20° C. below a critical temperature Tc, which is a temperature at which said ring is likely to deteriorate.

8. The assembly according to claim 1, wherein said material vaporizes at a temperature of at least 20° C. below a critical temperature Tc, defined as a temperature at which said ring is likely to deteriorate, the vaporization of said material occurring in the hottest parts of said pin, and said material condensing near to said connectors, a convection motion appearing inside said pin ensuring its cooling in the vicinity of said ring.

9. The assembly according to claim 8, wherein said material is selected from among the following materials: water, alcohols, trichloroethylene, trichloroethane, tetrahydrofuran, thiols.

10. The assembly according to claim 1, wherein said material is a metal or metallic alloy that is liquid at one temperature of at least 20° C. below a critical temperature Tc, which is a temperature at which said ring is likely to deteriorate.

11. The assembly according to claim 10, wherein, for a critical temperature of around 120° C., said metal or metallic alloy is selected from the following list: sodium, potassium, rubidium, gallium, cesium, mercury, sodium/potassium alloy.

\* \* \* \* \*